(12) United States Patent
Zenge et al.

(10) Patent No.: US 10,757,291 B2
(45) Date of Patent: Aug. 25, 2020

(54) EMBEDDING PROCEDURES ON DIGITAL IMAGES AS METADATA

(71) Applicant: International Business Machines Corporation, Armonk, NY (US)

(72) Inventors: Naomi Zenge, Tokyo (JP); Yuka Abe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/186,640

(22) Filed: Nov. 12, 2018

(65) Prior Publication Data

US 2020/0153995 A1 May 14, 2020

(51) Int. Cl.
*H04N 1/32* (2006.01)
*G06T 11/60* (2006.01)

(52) U.S. Cl.
CPC ......... *H04N 1/32149* (2013.01); *G06T 11/60* (2013.01)

(58) Field of Classification Search
CPC ...................................................... G06T 11/60
See application file for complete search history.

(56) References Cited

U.S. PATENT DOCUMENTS

| | | | |
|---|---|---|---|
| 7,103,230 B1 | 9/2006 | Jam et al. | |
| 7,127,164 B1 * | 10/2006 | Parulski | G11B 27/105 396/287 |
| 7,813,577 B2 | 10/2010 | Kotani et al. | |
| 9,472,010 B2 | 10/2016 | Hodges et al. | |
| 10,417,184 B1 * | 9/2019 | Long | G06F 16/182 |
| 2006/0170704 A1 | 8/2006 | Kotani et al. | |
| 2009/0295787 A1 * | 12/2009 | Yao | G06T 11/00 345/418 |
| 2013/0235074 A1 | 9/2013 | Cherna et al. | |
| 2016/0148407 A1 | 5/2016 | Hodges et al. | |
| 2016/0277793 A1 * | 9/2016 | Eyer | G11B 27/034 |
| 2018/0139429 A1 * | 5/2018 | Park | G09G 5/005 |
| 2018/0225290 A1 * | 8/2018 | Leppanen | G06F 16/48 |
| 2018/0242028 A1 * | 8/2018 | Van Brandenburg | H04N 21/23434 |
| 2019/0102646 A1 * | 4/2019 | Redmon | G06K 9/4619 |
| 2019/0251682 A1 * | 8/2019 | Feder | G06K 9/46 |
| 2019/0258859 A1 * | 8/2019 | Baynes | A01C 21/005 |

FOREIGN PATENT DOCUMENTS

JP 2006262202 A 9/2006

\* cited by examiner

*Primary Examiner* — Phi Hoang

(74) *Attorney, Agent, or Firm* — Daniel C. Housley

(57) ABSTRACT

A first digital image is integrated into a second digital image to generate a third digital image. A first code representing the procedures performed to integrate the first digital image into the second digital image is generated. A second code representing information for retrieving the first digital image is generated. The first code and the second code are embedded as metadata into a file that contains the second digital image.

20 Claims, 14 Drawing Sheets

EMBEDDING PROCEDURES ON DIGITAL IMAGES AS METADATA

BACKGROUND

The present disclosure relates to processing a digital image, and more particularly, to embedding procedures used in processing the digital image.

Digital images may be processed using a variety of techniques. Metadata describing the techniques may be used to describe the techniques and determine which technique was used to produce the digital image.

SUMMARY

According to an embodiment of the present disclosure, there is provided a method for processing an image. The method includes integrating a first digital image into a second digital image to generate a third digital image; generating a first code representing procedures performed to integrate the first digital image into the second digital image; generating a second code representing information for retrieving the first digital image; and embedding the first code and the second code as metadata into a file that contains the second digital image.

According to another embodiment of the present disclosure, there is provided a computer program product for processing an image. The computer program product includes a computer readable storage medium having program instructions embodied therewith. The program instructions are executable by a computer to cause the computer to: receive a file that contains a first digital image, the file including embedded metadata; retrieve a second digital image based on information in the embedded metadata that identifies the second digital image; convert a code into a command, the code being recorded in the embedded metadata, the code representing procedures performed to integrate the second digital image into the first digital image, the command instructing execution of the procedures; execute the command and integrating the retrieved second digital image into the first digital image; and display an integrated digital image.

According to still another embodiment of the present disclosure, there is provided a system for processing an image. The system includes a memory communicatively couple to a processor, wherein the computer system is configured to: generate a first code representing procedures performed to integrate a first digital image into a second digital image; generate a second code representing information for retrieving the first digital image; embed the first code and the second code as metadata into a file that contains the second digital image; retrieve the first digital image based on the second code in the embedded metadata that identifies the first digital image; convert the first code into a command, the command instructing execution of the procedures performed to integrate the first digital image into the second digital image; execute the command and integrating the retrieved first digital image into the second digital image to generate a third digital image; and display the third digital image.

DETAILED DESCRIPTION

Hereinafter, exemplary embodiments of the present disclosure will be described in detail with reference to the attached drawings.

It is to be noted that the present disclosure is not limited to these exemplary embodiments given below and may be implemented with various modifications within the scope of the present disclosure. In addition, the drawings used herein are for purposes of illustration, and may not show actual dimensions.

An original digital image may be processed to generate one or more processed digital images. Sending multiple images including the original image and the processed image(s) leads to an increase in the total data size sent to a receiver over a network, and it takes time before the receiver receives the images.

To reduce the data size sent to the receiver, a sender may zip, or otherwise combine, the images into a single file, but this requires the user to take time to select and compress the images. If the processed image(s) are sent without the original image to reduce the data size sent, the receiver cannot obtain the original image and cannot understand what processing (e.g., kinds and procedures of the processing) has been done to generate the processed image(s).

Exemplary embodiments of the present disclosure are directed to a system to store an original image and information about the processing on the original image that results in additional processed images based on the original image, while reducing the size of data.

Figure 1:
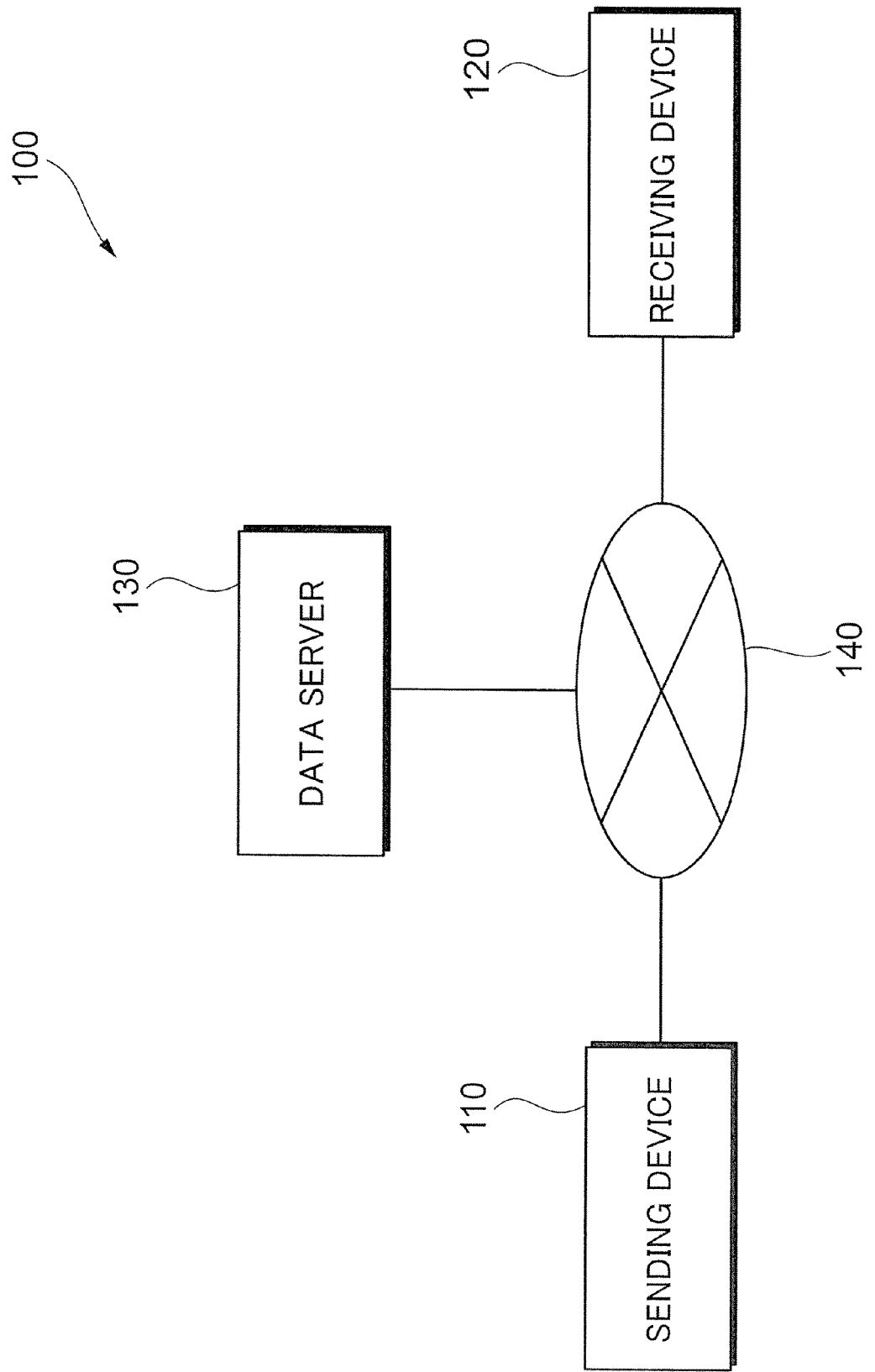
FIG. 1 illustrates an image processing system of an exemplary embodiment of the present disclosure.

FIG. 1 illustrates an image processing system 100, in accordance with an embodiment of the present disclosure.

The image processing system 100 may include a sending device 110, a receiving device 120, and a data server 130. These devices are connected via a network 140.

The sending device 110 is an information processor, which is e.g., a personal computer, for sending images. The sending device 110 processes the images to be sent.

The receiving device 120 is an information processor (e.g., a personal computer or other suitable data-processing device), for receiving images. The receiving device 120 displays the received images.

The data server 130 receives and stores images from the sending device 110, and sends the stored images to the receiving device 120 in response to a request by the receiving device 120. Data server 130 may vary in classification or type, depending on the communication system used for sending and receiving images. For example, when images are sent by being attached to e-mails, the data server 130 may operate as an email server. When images are transferred on a file sharing system, the data server 130 may operate as a file sharing system.

The network 140 is for data communication among the above devices. The network 140 is not limited to a particular type or configuration of network, and examples of the network 140 may include a local area network (LAN), a wide area network (WAN), and the Internet. Either or both of wired and wireless communications may be used for data communication. A relay device, such as a gateway and a router, may be used to connect the above devices via multiple networks or communication lines.

Figure 2:
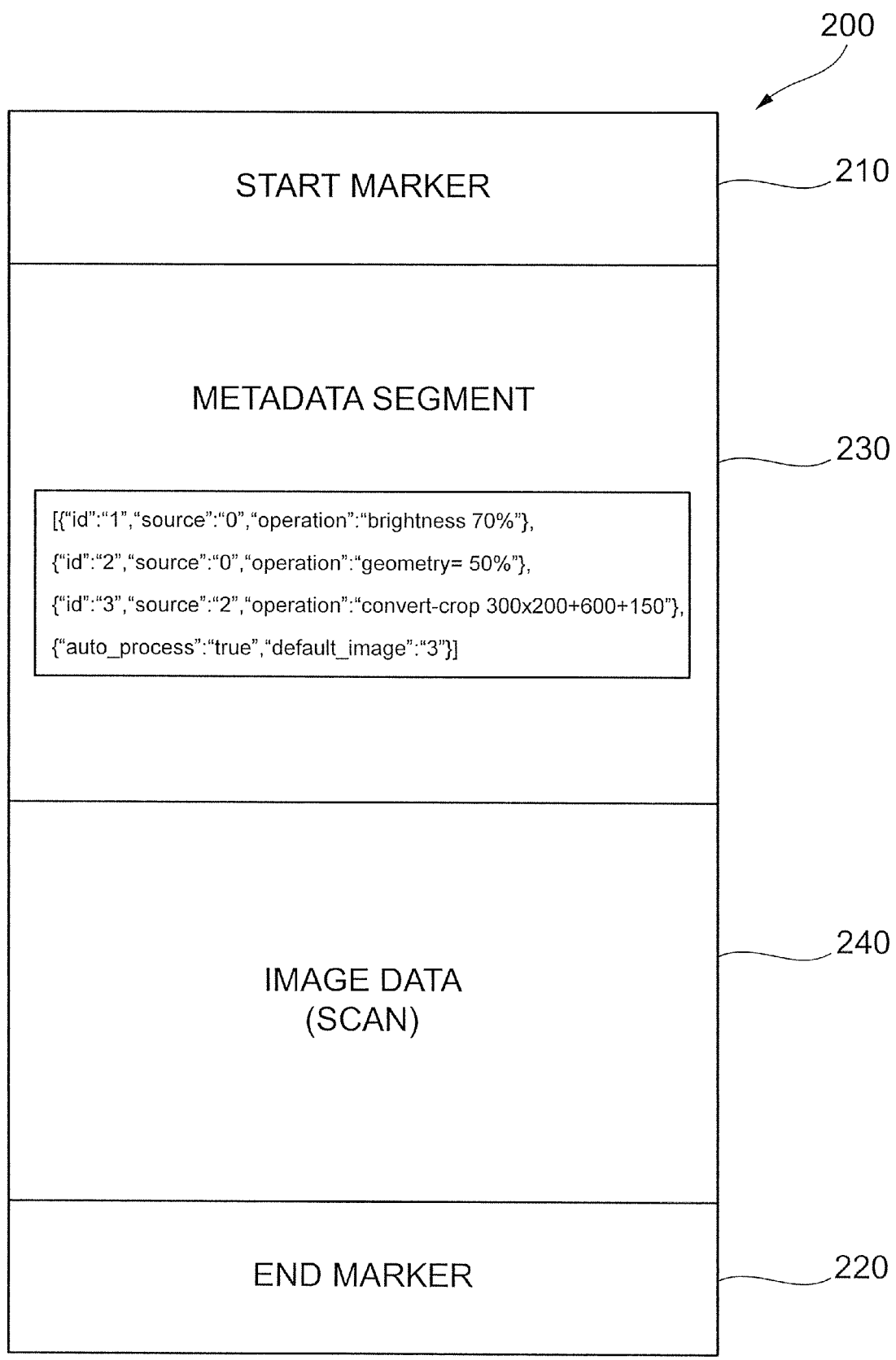
FIG. 2 illustrates a structure of an image file exchanged between a sending device, a receiving device and a data server.

FIG. 2 illustrates a structure of an image file 200 exchanged between the sending device 110, the receiving device 120, and the data server 130.

The image file 200 of the exemplary embodiment is not necessarily limited to a particular format, as long as the image file 200 can contain a field for variable or fixed length metadata. Examples of formats of the image file 200 may include a Tagged Image File Format (TIFF) or a Joint Photographic Experts Group (JPEG), both of which can include Exchangeable Image File Format (EXIF) data.

Although the particular file layout for each file format may be different, generally, an image file 200 may contain a Start of Image (SOI) marker 210, an End of Image (EOI) marker 220, a metadata segment 230, and an image data (Scan) 240.

The SOI marker 210 is data representing the beginning of an image file. The EOI marker 220 is data representing the end of the image file. The metadata segment 230 is a field for recording metadata. The image data 240 is a field for recording digital data of an image. Hereinafter, the image recorded in the image data 240 is referred to as an "original image" (second digital image).

In the present exemplary embodiment, three kinds of information are stored in the metadata segment 230 as metadata, namely processing information (first code), additional image information (second code) and display control information (third code). The processing information indicates procedures for processing the original image recorded in the image data 240 to generate a processed image. The additional image information identifies each of the images to be integrated when processing on an image includes integration of plural images. Integration of images is performed by adding image(s) to a base image, which is the original image recorded in the image data 240. The image(s) added to the base image is referred to as an "additional image" (first digital image). An image obtained by adding an additional image to the base image is referred to as an integrated image (third digital image). The integrated image is an example of processed digital images. The display control information specifies how an image is to be displayed. Details of each information will be described in more detail below.

Figure 3:
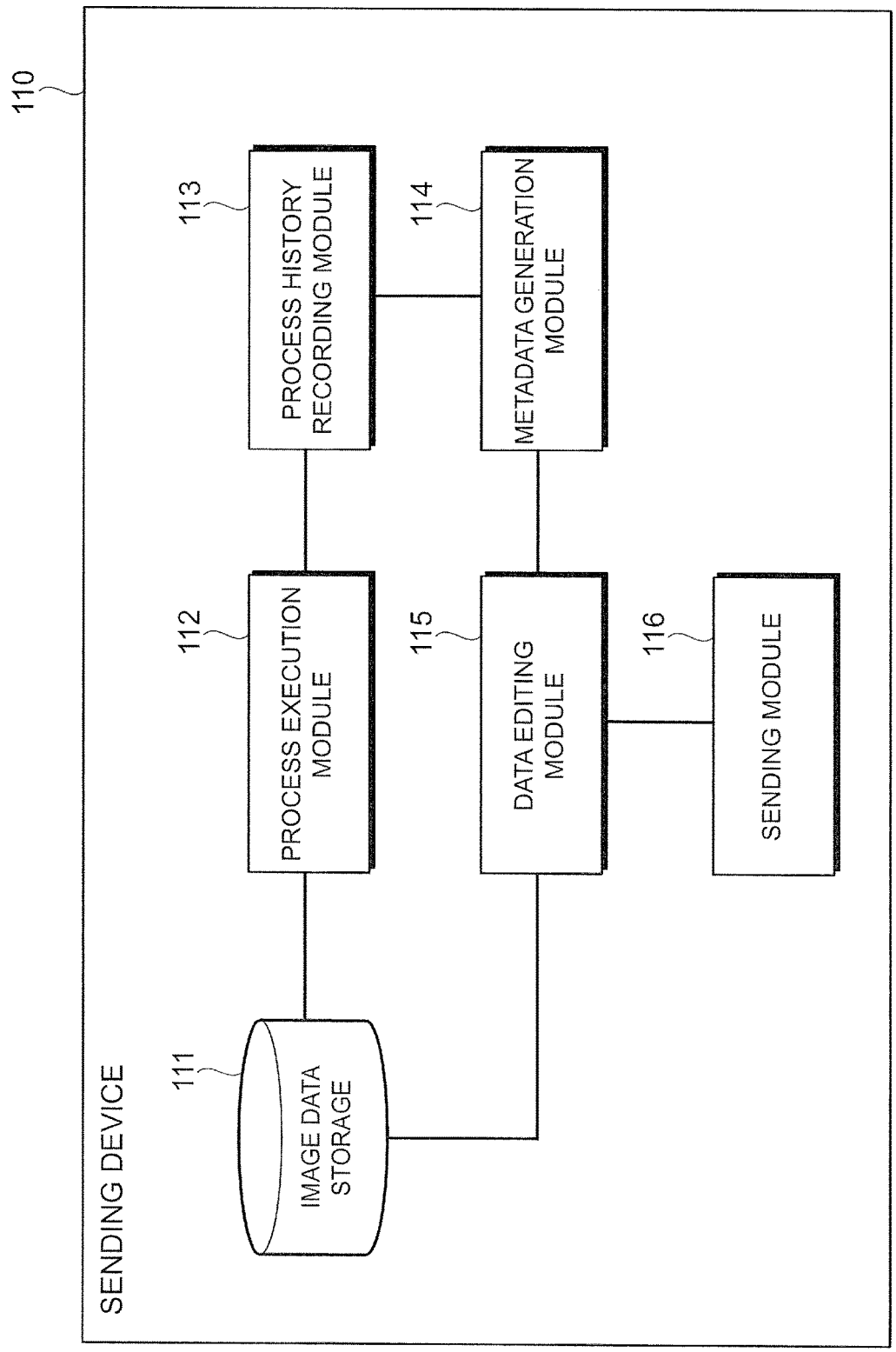
FIG. 3 illustrates a functional configuration of the sending device.

FIG. 3 illustrates a functional configuration of the sending device 110.

The sending device 110 may include an image data storage 111, a process execution module 112, a process history recording module 113, a metadata generation module 114, a data editing module 115, and a sending module 116.

The image data storage 111 stores the image file 200 to be sent. After the process execution module 112 processes an image, the image data storage 111 stores the image file 200 embedded with processing information as metadata.

The process execution module 112 processes an image according to an operation by a user. The processing by the process execution module 112 is not limited to a particular kind of processing, and examples of the processing may include changing brightness, contrast or colors, enlarging or reducing the size, rotating, inverting, deforming or cropping the image and other processing. Also, the process execution module 112 may integrate plural images.

The process history recording module 113 generates history data of processing performed by the process execution module 112 and records this process history data in a memory.

The metadata generation module 114 converts the process history data generated by the process history recording module 113 into a code group of metadata that is embeddable into the image file 200. This generates the above-described metadata representing the processing information. When the processing performed by the process execution module 112 involves integration of plural images, the metadata generation module 114 generates metadata of the additional image information that identifies each of the images to be integrated. Further, the metadata generation module 114 generates metadata of the display control information.

The data editing module 115 writes the metadata generated by the metadata generation module 114 into the metadata segment 230 of the image file 200.

The sending module 116 sends the image file 200 including the original image and the embedded metadata to the data server 130.

To implement the above functional configuration, the image data storage 111 may be implemented by, for example, a storage device such as a magnetic disk drive and a non-volatile memory. The process execution module 112, the process history recording module 113, the metadata generation module 114, and the data editing module 115 may be implemented by, for example, a central processing unit (CPU) executing application software stored in a memory. Application programs for implementing the process execution module 112 and the process history recording module 113 may be any known graphics software. The sending module 116 may be implemented by, for example, a communication interface that can connect to the network 140 to exchange data with the data server 130.

Figure 4:
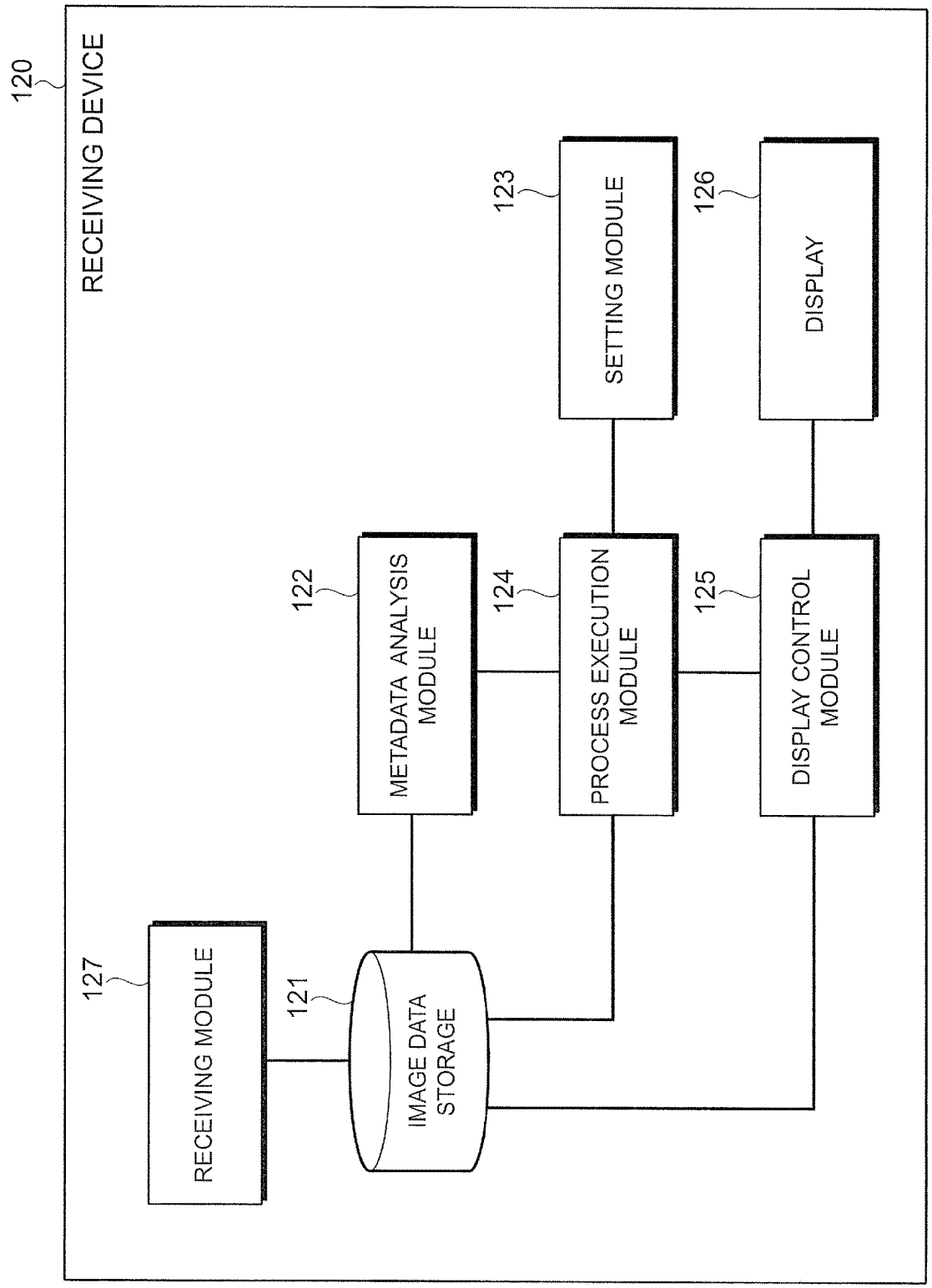
FIG. 4 illustrates a functional configuration of the receiving device.

FIG. 4 illustrates a functional configuration of the receiving device 120.

The receiving device 120 may include an image data storage 121, a metadata analysis module 122, a setting module 123, a process execution module 124, a display control module 125, a display 126, and a receiving module 127.

The image data storage 121 stores the image file 200 received from the data server 130. When processing on the image in the image file 200 involves integration of plural images, the plural images for integration may be stored in one directory in which the image file 200 is stored.

The metadata analysis module 122 analyzes the metadata of the image file 200 stored in the image data storage 121 and extracts the processing information, the additional image information and the display control information. The metadata analysis module 122 further converts the extracted processing information into control commands and control data that are executable by the process execution module 124.

The setting module 123 specifies settings for controlling display of the image in the image file 200. Specifically, the setting module 123 specifies whether the display is to be made according to the display control information recorded in the image file 200 as metadata. Further, the setting module 123 specifies whether, when the display is not to be made according to the display control information, processing is to be executed based on the processing information. Alternatively, the setting module 123 may allow a user to select whether processing is to be executed based on the processing information. In this case, the setting module 123 may cause the display 126 to display a setting screen on which the user can enter his/her selection, and may specify settings for processing according to the selection entered by the user on the setting screen.

When the settings specified by the setting module 123 instruct processing based on the processing information, the process execution module 124 processes the original image, which is recorded in the image data 240, based on the processing information stored as the metadata. The process execution module 124 performs processing operations when any of the following conditions is met:

(1) reproduction of processing operations is instructed by the user's input;

(2) reproduction of processing operations is specified in the settings by the setting module 123; and (3) settings by the setting module 123 specify that display be made according to the display control information, and the display control information instructs display of a processed image.

Further, when the processing involves integration of plural images, the process execution module 124 retrieves the images to be integrated. Details of this retrieval operation will be described in more detail below. Note that the metadata analysis module 122 may perform this retrieval operation instead of the process execution module 124.

The display control module 125 reads the image data 240 in the image file 200 and causes the display 126 to display the image according to the settings by the setting module 123. When the settings by the setting module 123 do not instruct processing on the image, the display control module 125 displays the original image itself read from the image data 240. When the settings by the setting module 123 instruct processing on the image, the display control module 125 displays the processed image, which is an image generated by processing the original image by the process execution module 124.

The display 126 displays the image under the control of the display control module 125. The display 126 may be implemented by a display device.

The receiving module 127 receives the image file 200 from the data server 130. The receiving module 127 stores the received image file 200 in the image data storage 121.

To implement the above functional configuration, the image data storage 121 may be implemented by, for example, a storage device such as a magnetic disk drive and a non-volatile memory. The metadata analysis module 122, the setting module 123, the process execution module 124, and the display control module 125 may be implemented by, for example, a CPU executing application software stored in a memory. The receiving module 127 may be implemented by, for example, a communication interface that can connect to the network 140 to exchange data with the data server 130.

Now, explanation will be given of the metadata of the image file 200. As described above, in the present exemplary embodiment, three kinds of information, namely the processing information, the additional image information, and the display control information are stored as metadata.

Hereinafter, each of the three kinds of information will be explained with reference to specific code examples.

In the metadata segment 230 of the image file 200 shown in FIG. 2, the following codes are described as the processing information:

[{"id":"1","source":"0","operation":"brightness 70%"},
{"id":"2","source":"0","operation":"geometry=50%"},
{"id":"3","source":"2","operation":"convert -crop 300× 200+600+150"}]

In each of the above codes, the "id" identifies a processing operation. That is, the processing information may contain plural processing operations. In each of the above codes, the "source" represents an image to be processed. In the "source", an image to be processed is identified by the "id" number, and the "source":"0" represents the original image. Further, the "operation" represents content of the processing operations.

In the example shown in FIG. 2, the code of id=1 represents processing on the original image to adjust the brightness to 70%. The code of id=2 represents processing on the original image to reduce the size to 50%. The code of id=3 represents processing on the image processed by the code of id=2 to crop out an image of 300×200 pixels from a reference position located at coordinates (600, 150). Here, the reference position represents a position at the upper left corner of the cropped-out image. Coordinates of the reference position are expressed by X-Y coordinates with the origin (0, 0) located at the upper left corner of the image to be processed (the image having undergone the processing by the code of id=2 in this example).

Recording the above processing information results in the image file 200 containing one image (the original image ("source":"0") recorded in the image data 240) from which three images can be reproduced, namely, the image by the code of id=1, the image by the code of id=2, and the image by the code of id=3. This also makes the image file 200 have information about what processing has been done to generate the images by the respective codes of id=1, id=2, and id=3.

Figure 5:
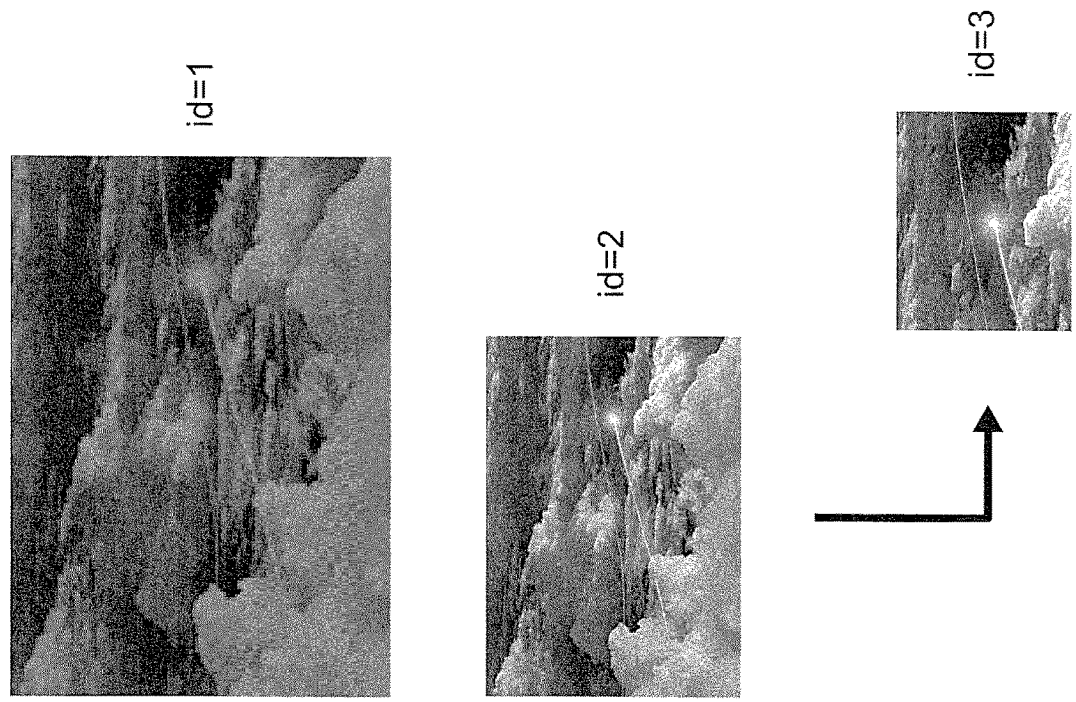
FIG. 5 illustrates relationship between images obtainable from an image file.
Figure 5:
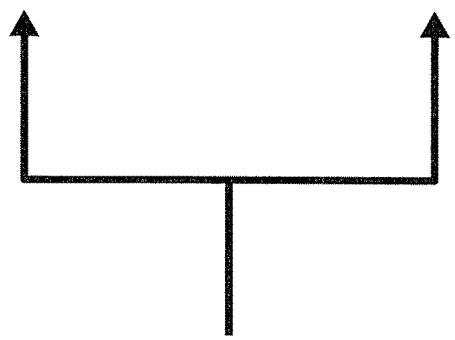
Figure 5:
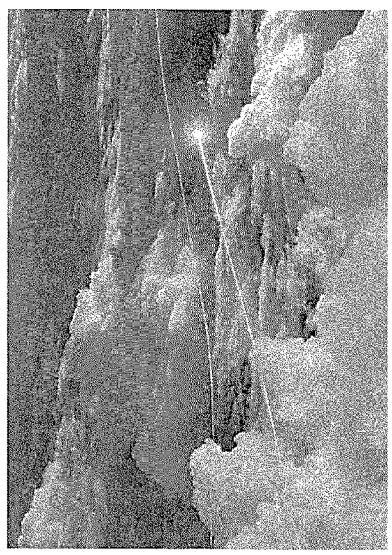

FIG. 5 illustrates relationship between the images obtainable from the image file 200. This relationship between the original image, the image by the code of id=1, the image by the code of id=2, and the image by the code of id=3 is based on the processing information shown in FIG. 2. Referring to FIG. 5, the original image is processed to generate the image by the code of id=1 and the image by the code of id=2. Further, the image by the code of id=2 is processed to generate the image by the code of id=3. The images in FIG. 5 may depict the reentry of an object, such as a satellite, into the atmosphere.

Figure 6:
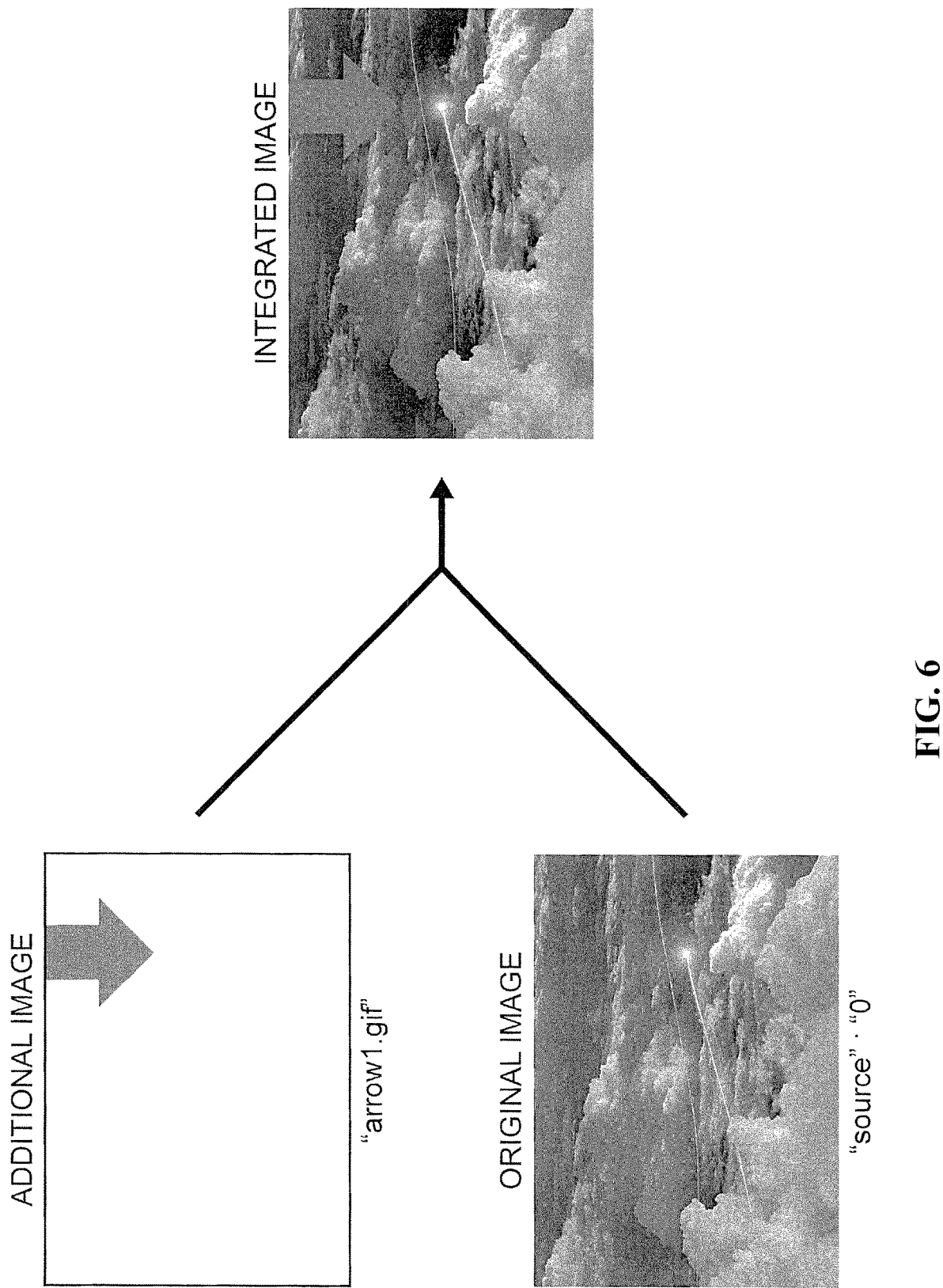
FIG. 6 illustrates integration of plural images.

FIG. 6 illustrates integration of plural images. In FIG. 6, the "source":"0" is the base image (original image), and the "arrow1.gif" is an additional image. In this example, the additional image is overlaid on the base image to generate an integrated image (processed image).

In the example shown in FIG. 6, the code for integrating the images may be described in the metadata segment 130 as follows:

[{"id":"1","source":"0","operation": "image1=arrow1.gif, location=800+0, method=overlay"}]

In the above code, the "image1=arrow1.gif" represents the additional information. That is, the image "arrow1.gif" is specified as an image to be added to the base image. The code thus instructs the additional image "image1=arrow1.gif" to be overlaid on the base image, which is the original image ("source":"0"), at coordinates (800, 0) of the base image.

In the above code, a file name is described as the additional image information for designating the additional image. Use of the file name in the code is available when an additional image may be identified by its file name, e.g., when the additional image is stored in the same directory as the base image. The additional image may be designated by any other methods including designating a storage location of the additional image, embedding the additional image itself in the metadata, and describing a command to draw the additional image.

In designating a storage location of the additional image, for example, the file of the additional image is stored in a server on a network where a storage location may be identified by a uniform resource locator (URL) or stored in a storage where a storage location may be identified by a file path. Describing the URL or the file path in the code as the additional image information allows to designate the additional image. For example, when the file of the additional image is stored in the URL: https://ibm.cloud/ . . . /arrow1.gif, then the additional image information may be described as "image1=https://ibm.cloud/ . . . /arrow1.gif" in the code of the processing information indicative of integration of the images.

In embedding the additional image itself in the metadata, for example, data of the additional image is encoded into binary data, and the encoded data is embedded as the additional image information. The encoded binary data may be expressed as text data using any known scheme such as Base64. For example, when text data of the encoded additional image reads "F32EA87B39ED31F7D9103B4A65B45A . . . ", then the additional image information may be described as "image1=F32EA87B39ED31F7D9103B4A65B45A . . . " in the code of the processing information indicative of integration of the images.

When the additional image is a simple object such as a circle, a polygon and a straight line and a function representing the object is available, a command to draw the image using the function may be described as the additional image information.

The display control information specifies how an image is to be displayed. In the present exemplary embodiment, recording the processing procedures in the image file 200 results in the image file 200 containing one unprocessed original image from which one or more processed images may be reproduced. This means that both of the original image and the processed image may be displayed based on the image file 200. Accordingly, in displaying an image based on the image file 200, the process execution module 124 may automatically execute processing operations based on the processing information to display the processed image. The display control information may contain a command that such automatic processing be executed.

Figure 7:
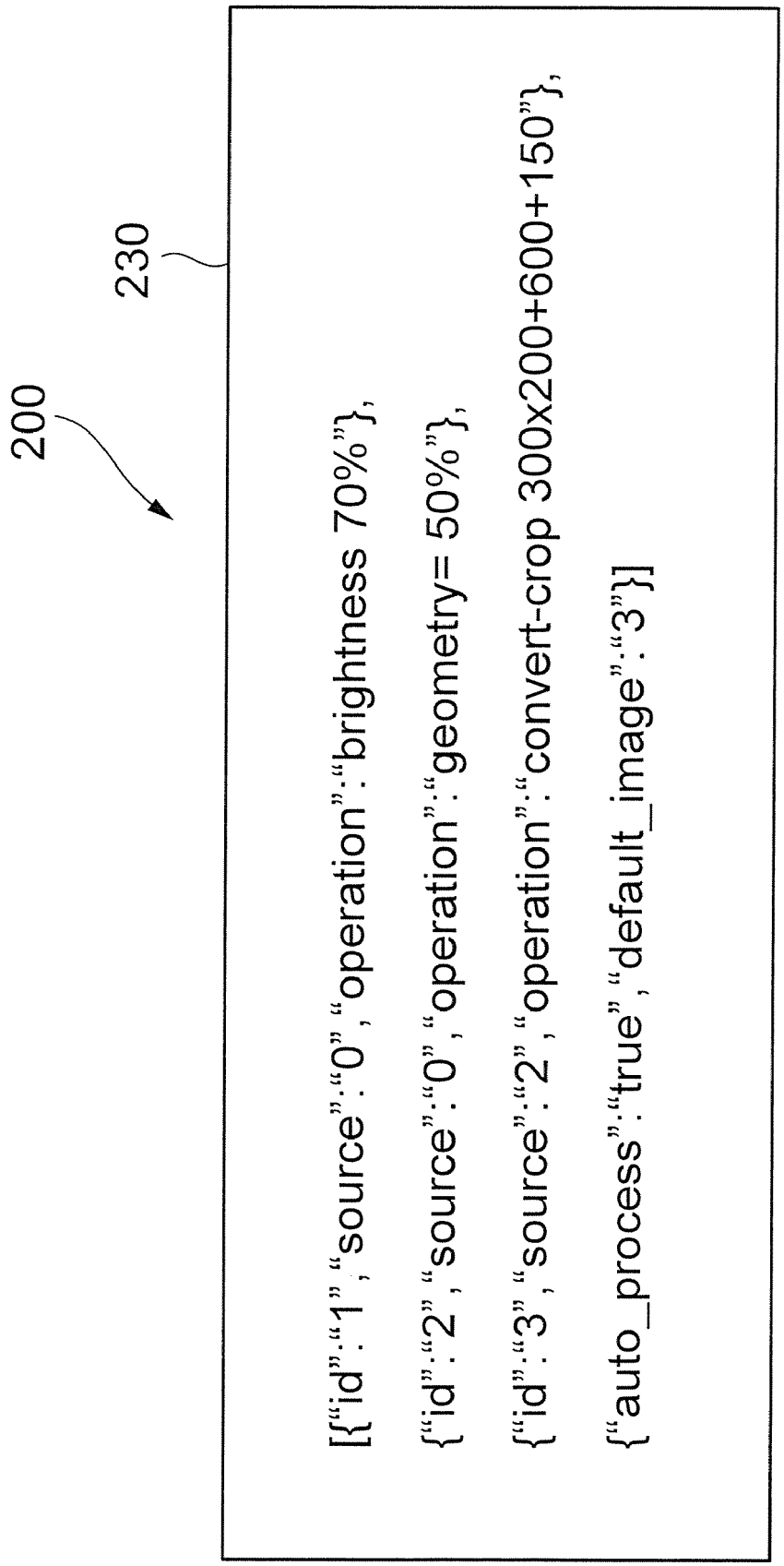
FIG. 7 illustrates an example of processing information and display control information.

FIG. 7 illustrates an example of the processing information and the display control information. In this example, the processing information, which is written in the metadata segment 230 of the image file 200 shown in FIG. 2, is appended with the display control information. In the code shown in FIG. 7, the display control information is described as follows:

{"auto_process":"true", "default_image":"3"}

In the above code, the element "auto_process" specifies whether processing on the image is automatically executed when the image is to be displayed based on the image file 200. In the example shown in FIG. 7, this element reads "auto_process":"true", which specifies that processing on the image be automatically executed. Execution of the process generates the processed image, and this allows plural images (the original image and the processed image) to be displayed. In the present embodiment, the four images shown in FIG. 5 may be displayed.

In the above code, the element "default_image" specifies which of the images is to be initially displayed. In the example shown in FIG. 7, this element reads "default_image":"3", which specifies that the image by the code of id=3 be initially displayed.

When the display control information contains a description "auto_process":"false" or does not contain the element "auto_process", the original image is initially displayed. Also, the element "default_image" may be described so as to specify that plural images be initially displayed or all of the original image and the processed image(s) be initially displayed.

Alternatively, the receiving device 120 may initially display any image according to the settings by the setting module 123 as described above, regardless of the description of the display control information.

Figure 8:
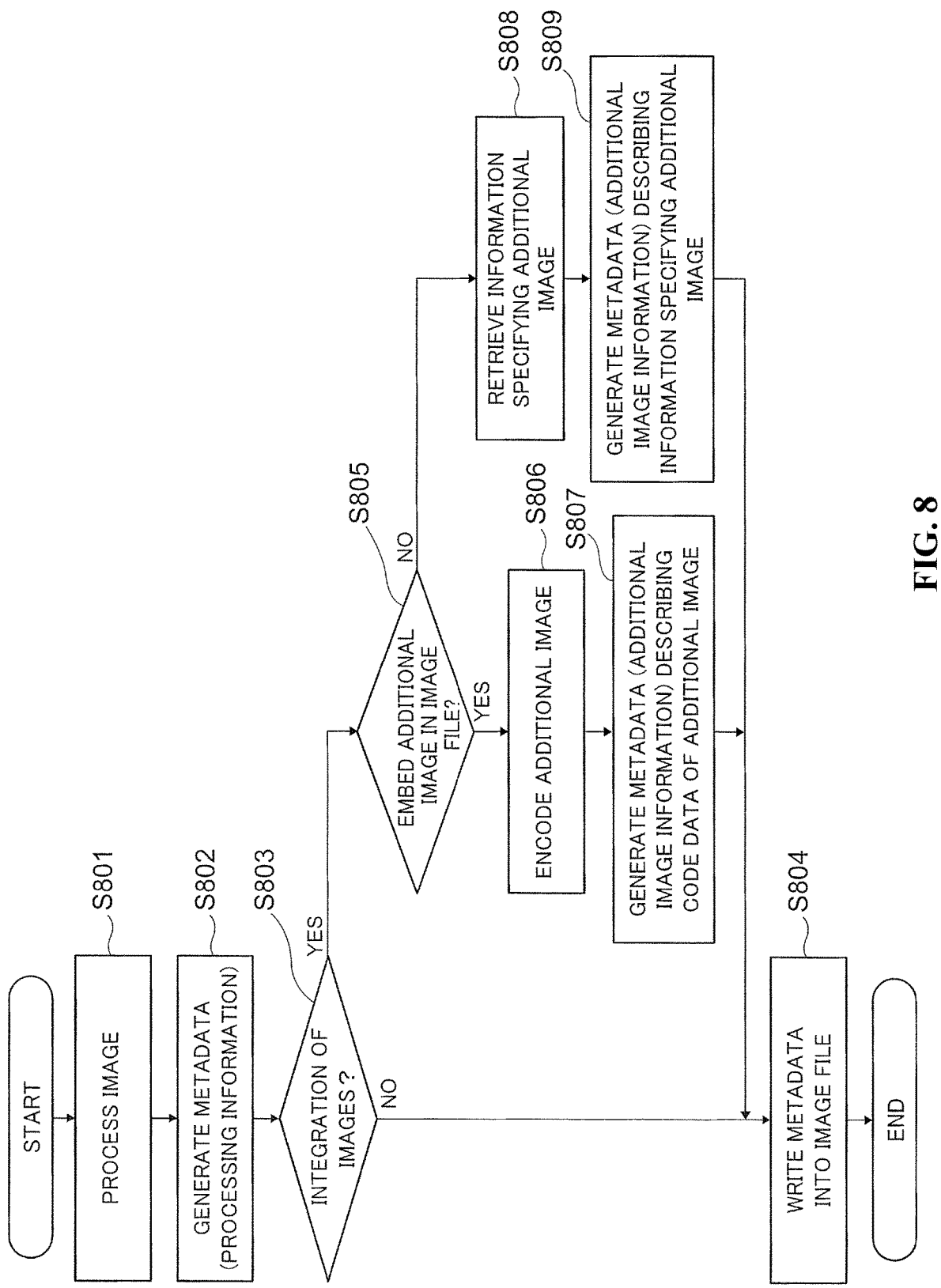
FIG. 8 is a flowchart illustrating operations of the sending device when processing an image.

Then, operations of the sending device 110 when processing an image will be explained below. FIG. 8 is a flowchart illustrating operations of the sending device 110 when processing an image.

In response to an operation by a user of the sending device 110, the process execution module 112 processes an image to be processed (S801). The process history recording module 113 records history data of the processing. Based on the history data, the metadata generation module 114 generates metadata (e.g., processing information) representing the processing procedures (S802).

When the executed processing does not involve integration of images (No in S803), the data editing module 115 writes the generated metadata into the metadata segment 230 of the image file 200 (S804).

On the other hand, when the executed processing involves integration of images (Yes in S803), the metadata generation module 114 determines whether the additional image is embedded in the image file 200 or left as an external file (S805). This determination may be made based on the data size of the additional image. Specifically, when the data size of the additional image is below a predefined threshold, the additional image may be embedded in the image file 200. When the data size of the additional image exceeds the threshold, the additional image may be left as an external file. Alternatively, settings may be made in advance as to whether additional images are embedded in the image file 200 or provided as external files, and any additional image may be handled according to the settings regardless of the data size of the additional image. Still alternatively, the user may select whether the additional image is embedded in the image file 200 or provided as an external file.

When the additional image is embedded in the image file 200 (Yes in S805), the metadata generation module 114 encodes the additional image (S806) and generates metadata (e.g., the additional image information) that describes code data of the encoded additional image (S807). Then, the data editing module 115 writes the metadata (e.g., the processing information and the additional image information) generated in S802 and S807 into the metadata segment 230 (S804).

On the other hand, when the additional image is provided as an external file (No in S805), the metadata generation module 114 retrieves information specifying the additional image (S808) and generates metadata (e.g., the additional image information) that describes the information specifying the additional information (S809). Then, the data editing module 115 writes the metadata (e.g., the processing information and the additional image information) generated in S802 and S809 into the metadata segment 230 (S804).

The information specifying the additional image may be any information that can be used to identify and retrieve the file of the additional image. For example, when the additional image is stored in an external storage device (e.g., the data server 130 or any other could server) that is accessible via the network 140, the information specifying the additional image may be a URL. When the additional image may be identified by its file name, such as when the file of the additional image and the image file 200 are stored in the same directory, the information specifying the additional image may be the file name.

Figure 9:
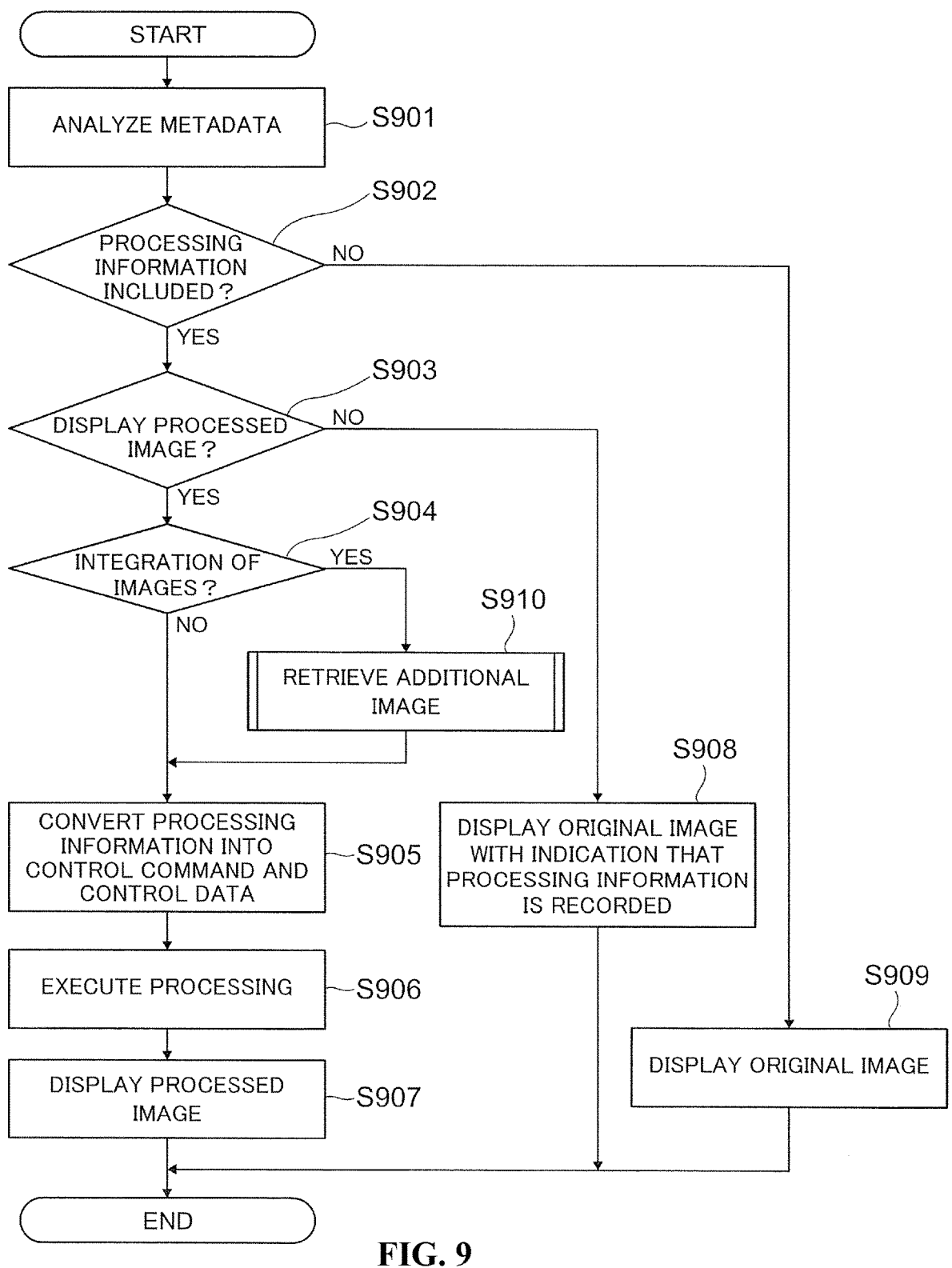
FIG. 9 is a flowchart illustrating operations of the receiving device when displaying an image
Figure 10:
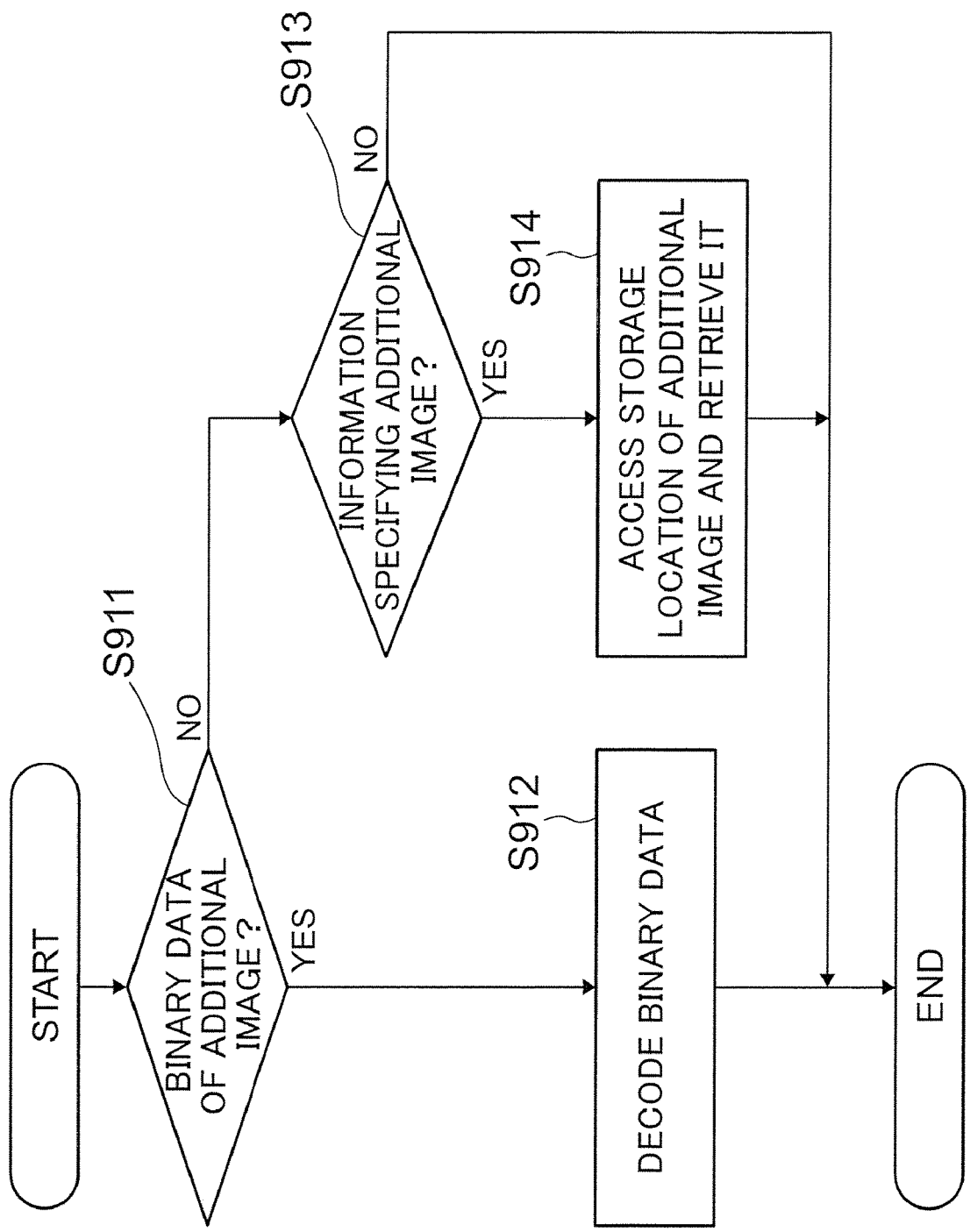
FIG. 10 is a flowchart illustrating operations of the receiving device when displaying an image

Then, operations of the receiving device 120 when displaying an image will be explained below. FIGS. 9 and 10 are flowcharts illustrating operations of the receiving device 120 when displaying an image.

When the receiving device 120 receives an input of a command to display the image in the image file 200, the metadata analysis module 122 analyzes the metadata recorded in the metadata segment 230 of the image file 200 (S901). When the metadata does not include processing information (No in S902), the display control module 125 causes the display 126 to display the original image (S909).

When the metadata includes processing information (Yes in S902), the setting module 123 determines which of the processed image or the original image is set to be displayed (S903). Which of the processed image or the original image is to be displayed may be set by the setting module 123 or may be specified in the display control information of the metadata recorded in the image file 200. When the original image is set to be displayed (No in S903), the display control module 125 causes the display 126 to display the original image along with a notification that the processing information is recorded, e.g., the processed image exists (S908).

When the processed image is set to be displayed (Yes in S903), the metadata analysis module 122 determines whether the processing information in the metadata includes integration of images (S904). When the processing information does not include integration of images (No in S904), the metadata analysis module 122 converts the processing information into control commands and control data that are executable by the process execution module 124 (S905). Then, the process execution module 124 executes the processing to generate the processed image (S906). Finally, the display control module 125 causes the display 126 to display the processed image generated by the process execution module 124 (S907). Along with the processed image, the display control module 125 may display a notification that the original image exists.

When the processing information includes integration of images (Yes in S904), the metadata analysis module 122 retrieves an additional image (S910). In retrieving an additional image (see FIG. 10), the metadata analysis module 122 determines whether binary data of the additional image is described as the additional image information in the metadata (S911). As mentioned above, the binary data of the additional image refers to data obtained by encoding the additional image by the sending device 110. When the additional image information is the binary data of the additional image (Yes in S911), the metadata analysis module 122 decodes the binary data to reproduce the additional image (S912). The file of the reproduced additional image may be stored in the image data storage 121 along with the image file 200. In this case, the image file 200 and the file of the additional image may be stored in the same directory.

When the additional image information is not the binary data of the additional image (No in S911), the metadata analysis module 122 determines whether the additional image information specifies the additional image (S913). When the additional image information specifies the additional image (Yes in S913), the metadata analysis module 122 accesses the storage location of the additional image based on this information specifying the additional image and retrieves the additional image (S914). The file of the retrieved additional image may be stored in the image data storage 121 along with the image file 200. In this case, the image file 200 and the file of the additional image may be stored in the same directory.

When the additional image information does not specify the additional image (No in S913), the metadata analysis module 122 is unable to identify the additional image and terminates the procedure without retrieving the additional image. Likewise, when the additional image information specifies a storage location of the additional image but retrieval of the additional image from the specified location fails, the metadata analysis module 122 terminates the procedure without retrieving the additional image.

Returning to FIG. 9, the metadata analysis module 122 then converts the processing information in the metadata into control commands and control data that are executable by the process execution module 124 (S905). Then, the process execution module 124 executes the processing, which involves integration of the base image (e.g., the original image) and the additional image obtained in S912 or S914, to generate the processed image (S906). Finally, the display control module 125 causes the display 126 to display the processed image (e.g., the integrated image) generated by the process execution module 124 (S907).

When retrieval of the additional image is unsuccessful, the process execution module 124 does not perform integration of the images and only executes other processing. Alternatively, processing by the process execution module 124 may be skipped in this case and the display control module 125 may cause the display 126 to display the original image. In either of these cases, the display control module 125 may display a notification that integration of the images has failed due to a failure to retrieve the additional image.

Now, an example of display of an image will be explained.

Display of an image included in the image file 200 by the receiving device 120 may be implemented by original application software or by image display functions of an operating system (OS). When the image is displayed using functions of the OS, for example, an application programming interface (API) may be used to expand functions of the OS to enable the OS to process the image or retrieve the additional image based on the metadata.

Figure 11A:
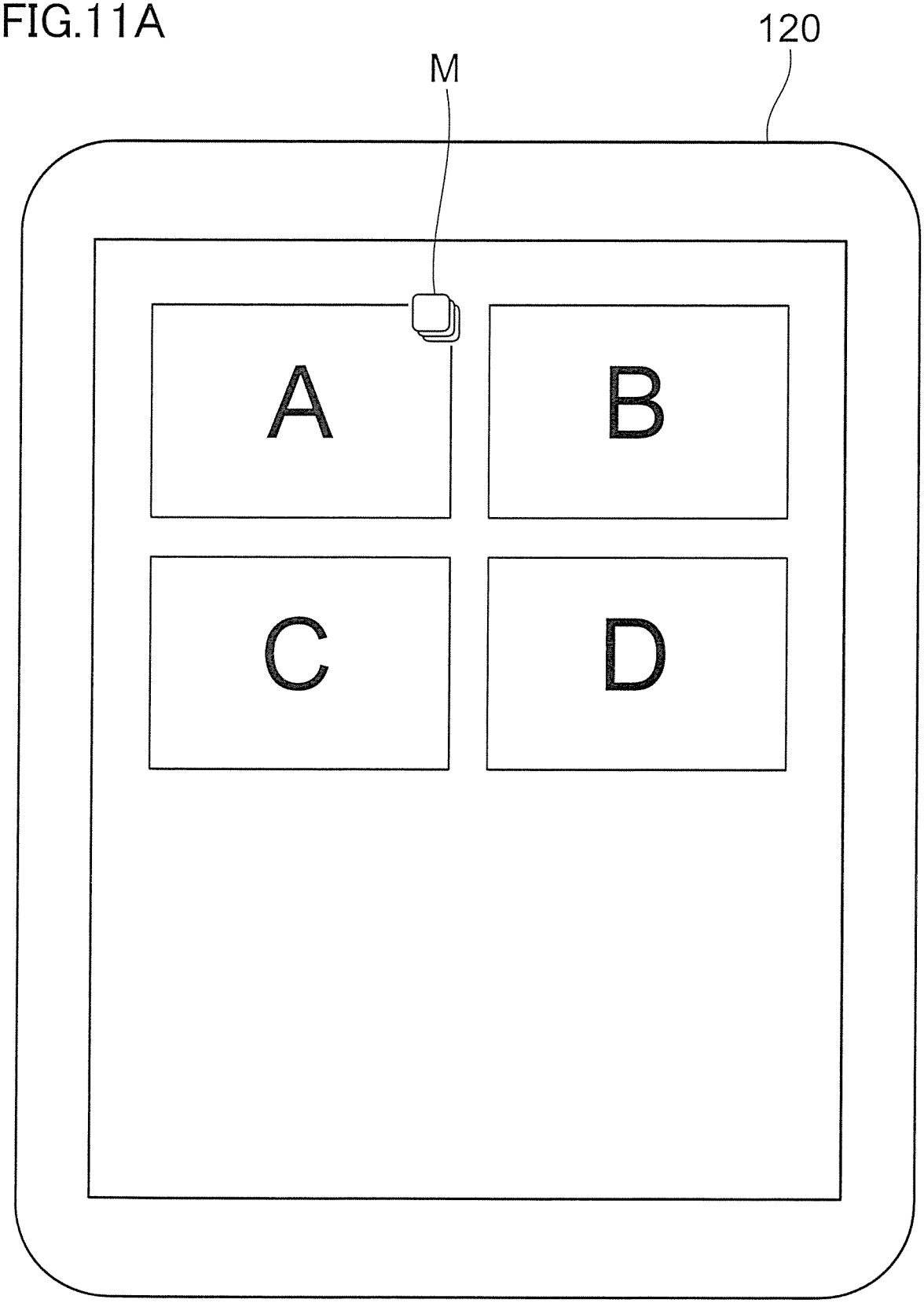
FIGS. 11A and 11B illustrate display of images by original application software.
Figure 11B:
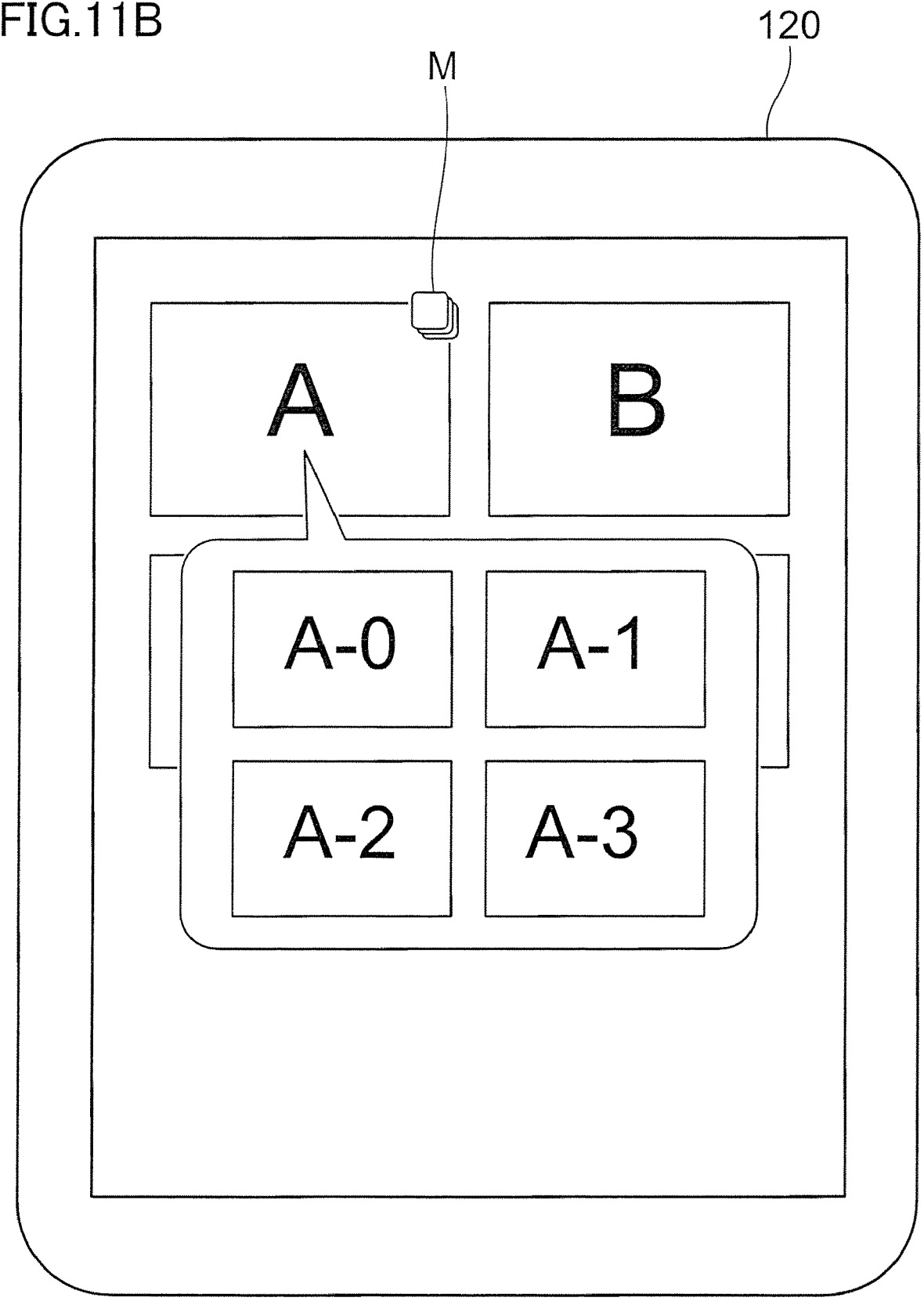

FIGS. 11A and 11B illustrate display of images by original application software. FIG. 11A illustrates display of original images, which are initially displayed. FIG. 11B illustrates display of all images including processed images.

In the example shown in FIG. 11A, a tablet device, which may be an embodiment of the receiving device 120, displays images on its display. In this example, four images A to D are displayed. The upper left image A is added with a mark M indicating that processing information is embedded. Selecting the image A by a user causes processed images to appear on the display.

In the example shown in FIG. 11B, a call-out window is overlaid on the image A. The window shows all images, namely the original image and the processed images, contained in the image file 200. In this example, the original image A-0 and the three processed images A-1, A-2 and A-3 are displayed.

Figure 12:
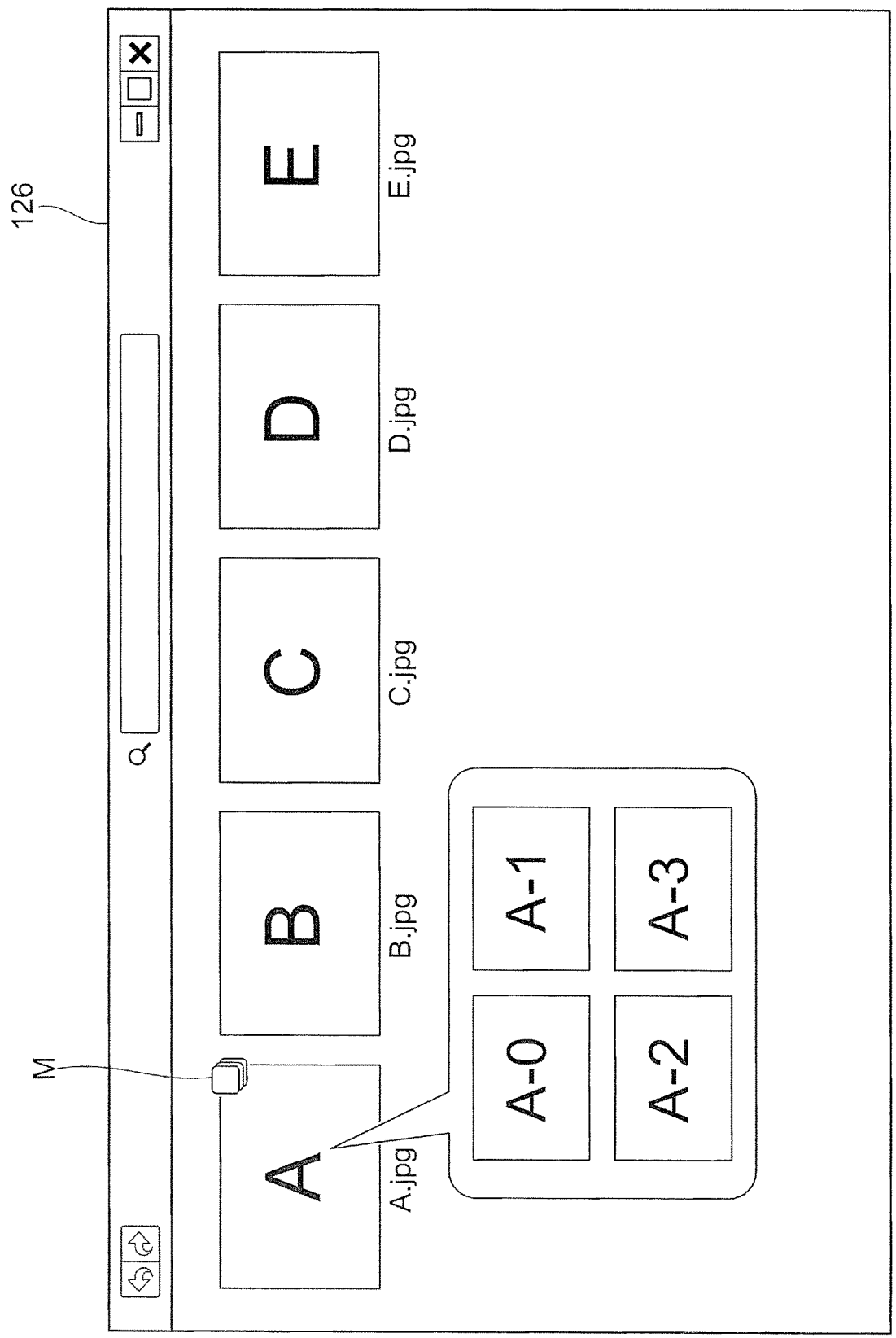
FIG. 12 illustrates display of images by functions of an operating system.

FIG. 12 illustrates display of images by functions of the OS. FIG. 12 shows a window of a file system of the OS displayed on the display 126 of a personal computer, which may be an embodiment of the receiving device 120. In this example, the image A embedded with the processing information as the metadata is selected from among the five images A to E, and all images contained in the image file 200 are displayed.

The mark M added to an initially displayed image informs the user that the processing information is embedded in the image file 200 of the image. Selecting this image embedded with the processing information by the user causes the other images in the image file 200 to be displayed. In the above example, the original image is initially displayed; instead of this, a certain processed image may be initially displayed according to the settings by the setting module 123 or the display control information described as the metadata. In this case too, the mark M may be added to the displayed processed image when the processing information is recorded in the image file 200.

In the above example, selecting the image embedded with the processing information causes the original image and the processed image to be displayed. When the processing involves integration of images, an additional image(s) may be displayed along with the original image and the processed image.

In the above embodiment, when the processing involves integration of images, encoded binary data of the additional image or information specifying a storage location of the additional image is embedded in the image file 200 as metadata. As a result, only the image file 200 having the original image, which is a basis for the integration, recorded in the image data 240 is sent from the sending device 110 to the receiving device 120. Instead of this, a pair of the file of the original image and the file of the additional image, which are subjects of the integration, may be sent from the sending device 110 to the receiving device 120, in accordance with an alternative exemplary embodiment.

Figure 13:
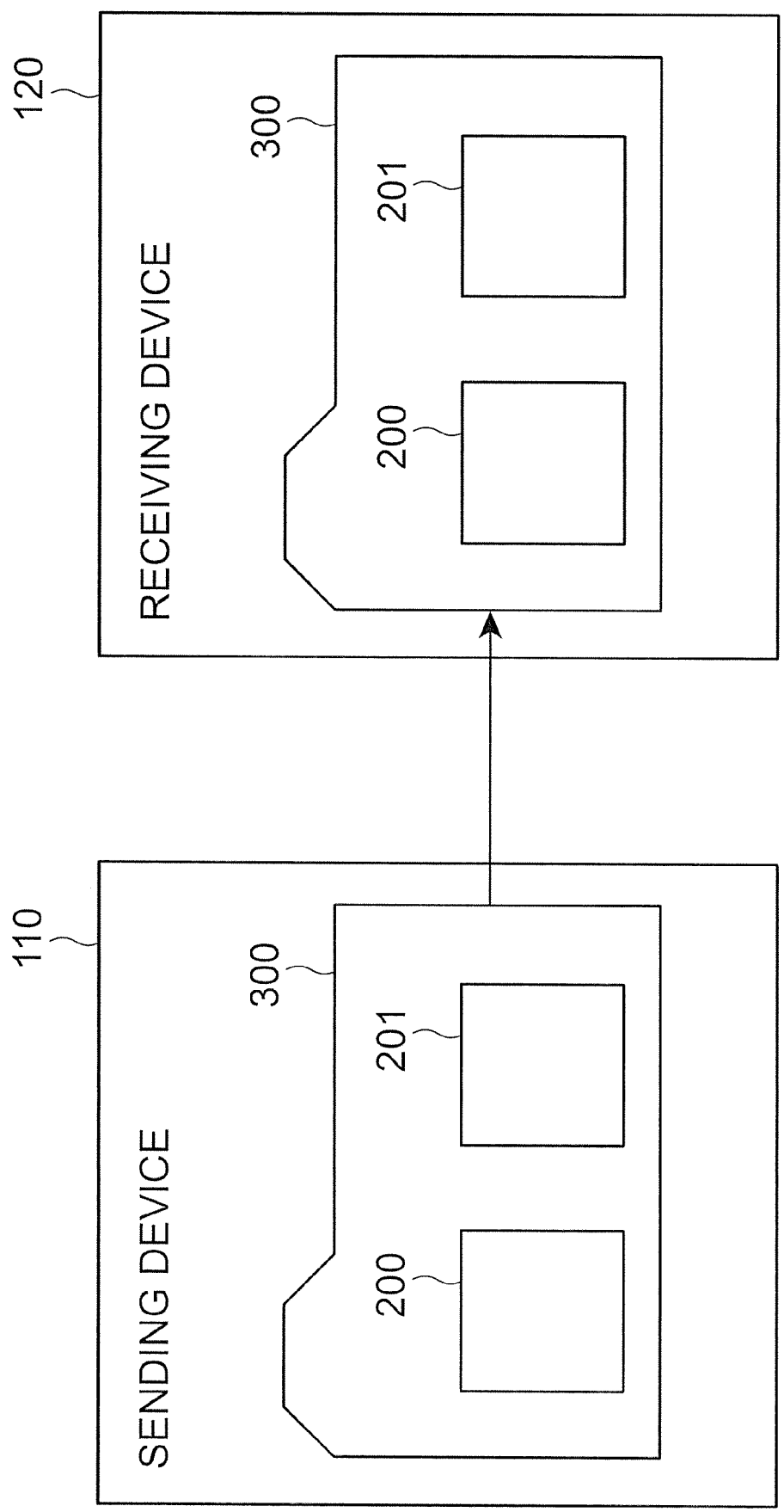
FIG. 13 illustrates transfer of files in an alternative exemplary embodiment.

FIG. 13 illustrates transfer of files in the alternative exemplary embodiment.

The sending device 110 and the receiving device 120 in the alternative exemplary embodiment has the same configurations as the sending device 110 and the receiving device 120, respectively, in the above exemplary embodiment explained with reference to FIGS. 1 to 12.

First, a base image and an additional image are prepared for integration of these images by the sending device 110. Processing information about the procedures for integrating these images is recorded as metadata in the metadata segment 230 of the image file 200 of the base image. The file name of the additional image may be described as the additional image information.

The sending device 110 then stores the image file 200 of the base image and a file 201 of the additional image in the same directory 300 and sends this directory 300 to the receiving device 120. The directory 300 storing the base image and the additional image may be archived and converted into a single file before being sent.

The receiving device 120 receives the directory 300 to select and display the image file 200 of the base image. Since the additional image exists in the same directory 300 as the base image, simply describing the file name as the additional image information allows to identify the additional image for integration.

In the alternative exemplary embodiment, the image file 200 embedded with the metadata of the processing information may further be added with identification information to distinguish from the file 201 of the additional image. This allows for proper selection of the base image at the receiving device 120. Alternatively, whichever image is selected, the selected image may be used as a base image for processing (e.g., integration of images) and the integrated image thus generated may be displayed. In this case, processing information is recorded as metadata in the image file 200 of each image to be integrated so that selecting any image allows to retrieve the processing information from its image file 200.

In the above exemplary embodiments, the sending device 110 and the receiving device 120 are distinct devices. However, the sending device 110 and the receiving device 120 may be a single device. In this case, one information processor acts as the sending device 110 to process an image and store it in the data server 130, and the same information processor acts as the receiving device 120 to receive the image from the data server 130 and display it. Further, the processed image is not necessarily stored in an external device (e.g., the data server 130), and may be stored in a storage of the device.

Specifically, such a single computer system may be implemented by a computer that executes program instructions stored in one or more computer readable storage media to cause the computer to perform a method including: generating a first code representing procedures performed to integrate a first digital image into a second digital image; generating a second code representing information for retrieving the first digital image; embedding the first code and the second code as metadata into a file that contains the second digital image; retrieving the first digital image based on the second code in the embedded metadata that identifies the first digital image; converting the first code into a command, the command instructing execution of the procedures performed to integrate the first digital image into the second digital image; executing the command and integrating the retrieved first digital image into the second digital image to generate a third digital image; and displaying the third digital image.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed herein. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable those of ordinary skill in the art to understand the embodiments disclosed herein.

What is claimed is:

1. A method for processing an image, the method comprising:
   integrating a first digital image into a second digital image to generate a third digital image;
   generating a first code representing procedures performed to integrate the first digital image into the second digital image;
   generating a second code representing information for retrieving the first digital image;
   embedding the first code and the second code as metadata into a file that contains the second digital image; and
   displaying the first digital image with an indication of the metadata.

2. The method according to claim 1, wherein the second code comprises binary data of the first digital image, the binary data being obtained by encoding the first digital image.

3. The method according to claim 1, wherein the second code comprises a code describing a storage location of a file that contains the first digital image.

4. The method according to claim 3, wherein the storage location is a file path of the file that contains the first digital image.

5. The method according to claim 1, wherein the first code and the second code are embedded in an EXIF format into the file that contains the second digital image.

6. The method according to claim 1, further comprising embedding a third code as metadata into the file that contains the second digital image, the third code including program instructions for displaying the third digital image.

7. The method of claim 6, wherein the third code includes a storage location of the first digital image, a brightness adjustment, a geometric size adjustment, an overlay adjustment, and a crop adjustment.

8. The method of claim 7, wherein the crop adjustment includes a reference position expressed in X-Y coordinates, the reference position associated with the upper left corner of the crop adjustment.

9. The method according to claim 1, further comprising embedding a third code as metadata into the file that contains the second digital image, the third code including program instructions for displaying the second digital image.

10. The method of claim 9, wherein the second digital image is displayed with an indication the first digital image exists.

11. The method of claim 1, wherein the indication includes a call-out window.

12. The method of claim 1, wherein the indication includes the metadata.

13. The method of claim 12, wherein selecting the indication causes the second digital image to be displayed.

14. The method of claim 12, wherein selecting the indication causes a call-out window containing a thumbnail of the second digital image to be displayed.

15. The method of claim 14, wherein the first digital image is stored locally, and the second digital image is stored remotely.

16. The method of claim 15, wherein the thumbnail is generated by executing the first code on the first digital image.

17. A computer program product for processing an image, the computer program product comprising a computer readable storage medium having program instructions embodied therewith, the program instructions executable by a computer to cause the computer to:

receive a file that contains a first digital image, the file including embedded metadata;

retrieve a second digital image based on information in the embedded metadata that identifies the second digital image;

convert a code into a command, the code being recorded in the embedded metadata, the code representing procedures performed to integrate the second digital image into the first digital image, the command instructing execution of the procedures;

execute the command and integrating the retrieved second digital image into the first digital image; and display an integrated digital image with an indication the first digital image exists.

18. The computer program product according to claim 17, wherein binary data of the second digital image is recorded in the embedded metadata, and the program instructions further cause the computer to decode the binary data to retrieve the second digital image.

19. The computer program product according to claim 17, wherein the code is embedded in an EXIF format into the file that contains the second digital image.

20. A system for processing an image, the system comprising:

a memory; and a processor in communication with the memory, wherein the system is configured to:

generate a first code representing procedures performed to integrate a first digital image into a second digital image;

generate a second code representing information for retrieving the first digital image;

embed the first code and the second code as metadata into a file that contains the second digital image;

retrieve the first digital image based on the second code in the embedded metadata that identifies the first digital image;

convert the first code into a command, the command instructing execution of the procedures performed to integrate the first digital image into the second digital image;

execute the command to integrate the retrieved first digital image into the second digital image to generate a third digital image; and display the third digital image with an indication the first digital image exists.

* * * * *